Aug. 8, 1950     A. J. TOWNSEND     2,517,943
STEAM ENGINE AND METHOD OF OPERATING THE SAME
Filed Feb. 21, 1945     7 Sheets—Sheet 1

INVENTOR
ALBERT J. TOWNSEND
BY
ATTORNEYS

INVENTOR
ALBERT J. TOWNSEND
ATTORNEYS

Aug. 8, 1950 — A. J. TOWNSEND — 2,517,943
STEAM ENGINE AND METHOD OF OPERATING THE SAME
Filed Feb. 21, 1945 — 7 Sheets-Sheet 5

Fig. 8. 60% CUT OFF 37% COMPRESSION

Fig. 9. 70% CUT OFF 57% COMPRESSION

INVENTOR
ALBERT J. TOWNSEND
BY
ATTORNEYS

Aug. 8, 1950  A. J. TOWNSEND  2,517,943
STEAM ENGINE AND METHOD OF OPERATING THE SAME
Filed Feb. 21, 1945  7 Sheets-Sheet 6

INVENTOR
ALBERT J. TOWNSEND
BY
ATTORNEYS

Aug. 8, 1950     A. J. TOWNSEND     2,517,943
STEAM ENGINE AND METHOD OF OPERATING THE SAME
Filed Feb. 21, 1945     7 Sheets-Sheet 7

INVENTOR
ALBERT J. TOWNSEND
BY
ATTORNEYS

Patented Aug. 8, 1950

2,517,943

UNITED STATES PATENT OFFICE 2,517,943

STEAM ENGINE AND METHOD OF OPERATING THE SAME

Albert J. Townsend, Lima, Ohio

Application February 21, 1945, Serial No. 579,093

22 Claims. (Cl. 105—48)

This invention relates to steam engines and methods of operating the same, and (while adaptable to other types of engines) is primarily useful in locomotive steam engines; the invention being particularly concerned with the problem of increasing the tractive power. In one of its major aspects, the invention contemplates the construction and/or operation of an engine of variable cut-off in such manner that excess torque present at starting or under certain conditions of heavy load is controlled by a braking action on the engine; and the invention also contemplates developing a braking action in the cylinders of the engine for this purpose and certain other purposes, as will later appear. To this end, the invention contemplates improvement in the distribution of the steam and especially in the handling of the exhaust and compression phases of steam distribution in a reciprocating type of engine; and, as applied to a locomotive, the invention involves new features and combinations of features relating to the boiler, the cylinders, the valve mechanism and the running gear, and new methods of operation.

In considering the objects and advantages of the invention it is first helpful to note some of the limitations heretofore present in the construction and operation of locomotives, since the invention is of especial utility in connection with steam locomotive engines, particularly of the reversible double-acting type having adjustable admission and exhaust valve events. In such engines, having adjustable and reversible valve gear, it is customary to start the engine with the valve gear set to a late cut-of adjustment (i. e. to admit steam throughout most of the stroke of the piston) and during the working of steam in one end of the cylinder it is usual (while in the starting phase) to leave the other end freely open to exhaust, throughout the major portion of the piston stroke. As the running speed increases, it is customary to adjust the valve gear to an earlier cut-off, until at very high speeds the admission of steam is for such a short part of the piston stroke that most of the work is accomplished by expansion of the steam. When the valve gear is hooked up to these early cut-offs, the timing of the admission is also advanced, i. e. the opening of the valve for admission (or what is usually termed "preadmission") of steam at each end of the cylinder occurs slightly earlier, with reference to the cycle of piston movement. When so adjusted for early cut-off, the valve gear is usually set to provide also a somewhat earlier release of steam to exhaust, and a considerably earlier closure of the cylinder to exhaust so as to obtain a longer period of compression for the purpose of adequately cushioning and arresting the piston (and the associated reciprocating parts) at the end of each stroke.

In such an engine, whether it have two cylinders or more than two, the reciprocation of the pistons and the rotation of the cranks, together with the angularity of the connecting rods, cause an irregularity in the torque on the driving wheels during each cycle of rotation thereof, with corresponding fluctuations in tractive power. Furthermore, in steam locomotives generally, the mean tractive power varies over the speed range, attaining its maximum when starting, i. e. at or near zero M. P. H., and progressively decreasing with increase in speed. It is of course important to have the highest tractive power available for starting a heavy load, but it has long been known in theory that it would be also of great advantage to have a high sustained tractive power at least up to the first quarter and preferably up to the first half of the total speed range, for this would not only enable the locomotive to maintain a substantial speed on grades, with the same load which it was able to start on the level, but would also aid materially in rapidly accelerating the load after making a stop, with the result that a given schedule might be maintained without having to attain as high a maximum running speed, or for a given running speed limit the locomotive could maintain a faster overall schedule, or within the same scheduled time it could make more stops.

Viewed from another angle, these desirable characteristics would enable a given locomotive to haul more cars over a line on a given schedule, or under suitable conditions would enable one locomotive to handle a train where two might otherwise have been required.

Many attempts have been made to at least partially secure these desirable objects by raising the entire tractive power curve, which may of course be done by raising the steam pressure delivered to the cylinders or by increasing the cylinder diameter, or in other ways; but such expedients are very limited in their application, because, while they do raise the average tractive power, they also raise the starting torque and the peaks of the irregular torque curve, thus reducing the factor of adhesion and causing slipperiness of the engine. This slipperiness may manifest itself in spinning of the driving wheels, not only when attempting to start a heavy load (especially when the track conditions are not conductive to adhesion) but also when the engine is working hard at higher speeds and suddenly encounters a section of slippery rail due to weather or other conditions.

The major object of the present invention is to overcome the foregoing difficulties in an effective and efficient way, and to gain the advantages of an increase in the average tractive power without a corresponding increase in engine slipperiness.

It is a further object of the invention to accomplish the foregoing by simple and reliable means, and in a manner which also increases the efficiency of the engine.

*Advantageous features as applied to locomotives generally*

In general, the invention contemplates accomplishing the foregoing and related objects, at least in part by a novel and advantageous control of the exhaust functioning of the valve means of the engine; some of the advantages of the invention being to a certain extent obtainable with or without an increase in boiler pressure or piston diameter, although such increase becomes practical with my invention and is utilized in a novel manner in connection therewith.

Still further, the invention contemplates the accomplishment of the foregoing by increasing the compression, as by lengthening the period of compression at starting, i. e. when the engine is usually operated with a long period of admission; so that, at a time when the steam in one end of the cylinder is normally free to exhaust, this steam is instead compressed, in opposition to the working of the incoming steam on the opposite face of the piston; and the invention contemplates such a timing of this compression phase that excessive torque peaks are reduced, at least under starting conditions, but to secure the full advantage of the invention it is contemplated that the cylinder bore and/or steam pressure should be increased so that the final result is an increase in mean tractive power, and a more uniform tractive power over at least the lower quarter or half of the speed range.

The novel method of operation, involving increasing the compression at start, may be effected by separate manual adjustments of the admission valve means and the exhaust valve means in locomotives equipped with separate admission and exhaust valves and separate controls therefor, by moving the exhaust valve control temporarily out of its normal full-gear position, at start, while the admission valve control is maintained in its full-gear position (one example of such a locomotive being illustrated in U. S. Patent 1,512,317, although my novel mode of operation is contrary to the intended operation taught in said patent); but in the preferred practice of my invention I contemplate carrying out the method by a new mechanism capable of a predetermined coordination of the admission and exhaust valve adjustments, whereby still other advantages are secured, as will hereinafter become apparent.

Aside from the use of the invention for increasing the average tractive power for normal operation, an additional feature of the invention comprises utilizing extended compression, while operating at long cutoff, as during drifting operation or the like, to develop just enough power in the cylinders to take up the lost motion in the machinery bearings and prevent undue pounding of these parts. This may be accomplished, in a locomotive having separately adjustable admission and exhaust valve means, by leaving the admission valve means in full gear, according to the direction in which the locomotive is traveling, at the same time setting the exhaust valve means to effect long compression, and throttling the steam supply so that the positive work done in the cylinders is about equal to the negative or compression work. The invention further contemplates securing this result by so operating a novel mechanism capable of predetermined coordination of the admission and exhaust valve events in the manner just mentioned. According to a further feature of the invention, the extended compression may be utilized, while operating at long cut-off, in a manner to set up a braking force to relieve or supplement the work of the conventional brake equipment. This can be accomplished by operating the admission and exhaust valves as just described, and throttling down the steam supply to the cylinders to such an extent that just enough steam would be admitted thereto to follow up the piston movement at a relatively low pressure, for instance not greatly exceeding the normal exhaust pressure, with the result that substantially all the work done in the cylinders is negative work, thus acting as a brake on the locomotive.

In addition to the above, the invention contemplates the attainment of the foregoing and other objects by a novel mechanism which is adapted to shorten the period of exhaust by causing the timing of the compression point to occur earlier in the piston stroke without necessarily effecting a corresponding change in the timing of the release; and in fact, where it is desirable, the invention contemplates a predetermined coordination of the admission valve events and the exhaust valve events such that the relative adjustment of the admission, the cut-off, and the release, may be unchanged as compared with normal practice, while the timing of the compression is made earlier than normal when the valve gear is set for long cut-off.

The invention further involves the accomplishment of the foregoing during starting of the engine, while preserving approximately the usual relationship between admission and exhaust events at high running speeds, and it is further contemplated that the timing of the compression point be progressively altered, and further that its alteration (in relation to the timing of the cut-off) be such that at the latest cut-off there will be a long period of compression, at intermediate cut-offs there will be a lesser but changing period of compression, and that at the earliest cut-offs there will again be a long period of compression (as is normal in existing engines); and according to the preferred practice of the invention the period of compression at maximum cut-off will be greater than the period of compression at minimum cut-off.

It is a further object of the invention to accomplish the foregoing purposes automatically, as by valve means and valve gear mechanism which, when adjusted by the engineman to alter the timing of the cut-off in the usual way, will automatically alter the timing of the compression event in the novel manner contemplated by this invention and through a novel mechanism.

In its preferred practice, the present invention is designed to accomplish the foregoing purposes in a locomotive engine having reciprocating valve means, more especially of the piston type, wherein the admission and exhaust events are usually tied together in a certain predetermined relationship, and the invention contemplates the provision in such an engine of means for altering the normal relationship of the adjustment between the compression and the other valve events, at least during the starting phase of operation.

Still more specifically, the invention contemplates the provision, in a steam engine having for each cylinder a reciprocating piston valve designed to effect all four valve events (i. e. admission, cut-off, release, and compression), of supplementary means for altering the point of compression in an independent manner during the starting phase of operation.

According to the preferred embodiment of the invention, the foregoing objects are accomplished by providing a supplementary exhaust valve in series with a main valve, and operating said supplementary valve to advance the timing of the compression event when the valves and valve gear as a whole are set for starting operation.

Other features of the invention involve the disposition of supplementary valve means in the same valve bushings wherein the main valve means work; the provision of supplementary valve elements at each end of the cylinder; the interconnection of said elements by operating means passing through the hollow central portion or trunk of the main piston valve; the provision of double sets of exhaust apertures in the valve bushings, with a main valve piston head working on one set, and a supplemental valve piston head working on an adjoining set, and the provision of exhaust passages and conduits so connected to said sets that said valve heads work in series; the provision of valve operating mechanism for such main valve and supplementary valve means actuated from a common valve gear, and in the preferred embodiment from the combining lever of the valve gear; and the provision of connections to the combining lever or other member of the valve gear to such main and supplementary valves, the points of connection being so chosen as to cause differences in the relative movements of the main and supplementary valves.

*Features especially advantageous in locomotives having auxiliary motors*

In many locomotives the tractive power problem has been partially met by the application of auxiliary motors to one or more axles other than the main driving axles. Since the boiler is normally adequate to supply only the cylinders of the main driving wheels at high speeds, such auxiliary motors are normally cut out of operation in the upper portion of the speed range. Another reason for cutting them out of operation at that time is because the wheels to which such auxiliary motors are usually applied are customarily of relatively small diameter (as compared with the main driving wheels), such as truck wheels, and their operation as driving wheels in the upper half or two-thirds of the speed range would produce excessive wear and tear on the auxiliary motor or motors.

According to the present invention, the limitations imposed upon the ordinary locomotive even when equipped with one or more such auxiliary motors, are to a large extent overcome, and it is thus a further object of the present invention to substantially increase the tractive power of a steam locomotive of the auxiliary-motor-equipped type throughout the speed range, without rendering the locomotive slippery at low speeds and without placing excessive load upon the boiler at high speeds.

Broadly, this phase of the invention contemplates the accomplishment of the foregoing object by employing, in an auxiliary-motor-equipped locomotive, engine means for driving the main wheels adapted to impose a maximum torque thereon in excess of the normal static adhesion of said wheels upon the rails, utilizing a braking means (such as an increased compression) to normally prevent slippage of said wheels during the starting phase of operation, and combining with these elements a boiler with a steaming capacity adequate to the maximum demands of such main engine means when operating in the higher portion of the speed range and approximating the combined steam consumption of the auxiliary motor means and the main engine means when said braking means is effective in the lower portion of the speed range.

In the preferred embodiment of the invention, provision is made for carrying such a boiler as described above, by supplying the locomotive not only with a plurality of driving wheels, but also preferably with front and rear trucks each with a plurality of axles, one or more or such axles being adapted for operation by the auxiliary motor means; and the invention contemplates the utilization of the increased boiler capacity, as so carried, to supply an auxiliary motor of capacity sufficient to drive a plurality of truck axles with full effectiveness.

Further in the preferred embodiment, the invention contemplates the securing of the desired increase in tractive power of the main driving wheels during the high-speed phase of operation by increasing the cylinder and piston diameter beyond that which, for a predetermined boiler pressure, would produce a torque approximating the static adhesion of the main driving wheels at start, although it will be understood that the increase in starting torque can be effected in whole or in part by increasing the boiler pressure beyond that which, for a given size of piston, would produce such a torque. For convenience, the cylinders may, in either case, be termed "over-powered" cylinders.

The control of the excess torque on the main driving wheels at start is, in the preferred embodiment, accomplished by imposing a braking action upon the pistons themselves, preferably by utilizing an extended compression in the operation of the valves of the main cylinders, at that time when the valves are set for late cut-off, as at starting, when the auxiliary motor is most effective. In other words, the valve means for the main cylinders are intentionally operated with a long compression at late cut-off as well as a long compression at the earliest cut-offs, although for efficiency and economy a shorter compression is employed during intermediate cut-off adjustments.

Advantageously, the valve mechanism employed for this phase of the invention may be similar to that hereinabove referred to as advantageous in locomotives generally, i. e. it comprises main valve means for the main cylinders, designed to control admission, cut-off, release and compression during normal high speed running, while supplemental valve means are provided for the main cylinders to control the compression during the lower portion of the speed range (at least in the early starting phase thereof) and are set to give a very early compression during the longest (starting) cut-offs.

To simplify the controls, the preferred embodiment of the invention involves an automatic coordination of the braking means with the valve adjustment mechanism, for example by utilizing an extended compression as the braking means and securing the extended compression function through the intermediation of the same valve adjustment mechanism. Thus a single reverse lever in the cab effects the desired functions in a coordinated manner. Where an auxiliary motor is additionally employed in the combination, its control may be of the known type which is operated under the influence of the reverse lever.

How the foregoing objects and advantages are attained, together with others which are incident to the invention, will be apparent from the following description, when taken together with the accompanying drawings.

Description of method and mechanism

Figure 1:
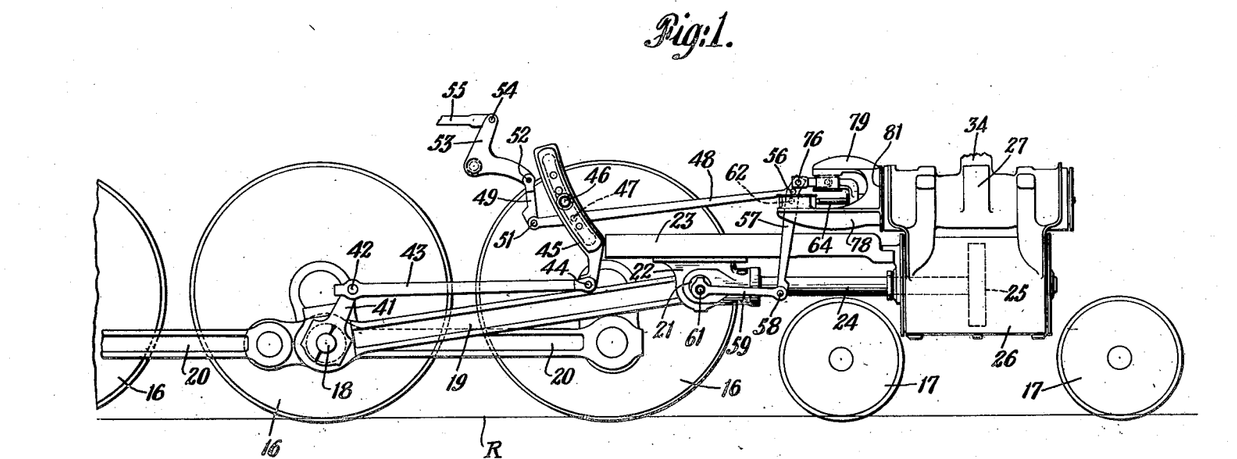
Figure 1 is a fragmentary side elevational view of part of the running gear of a reciprocating steam locomotive, embodying the present invention in association with a valve gear of the Walschaert type. In this view, the crank is near its bottom position, the piston having traversed one-half its stroke from the head end, and the valve gear is adjusted to a position for approximately 40% cut-off, for forward operation.
Figure 2:
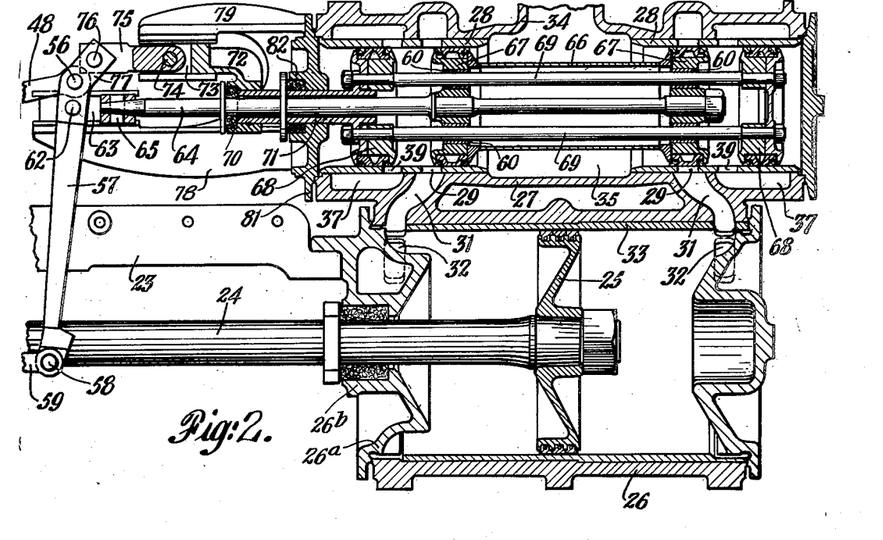
Figure 2 is an enlarged vertical longitudinal section through the cylinder and valve chest of Figure 1, showing certain associated parts in elevation.
Figure 3:
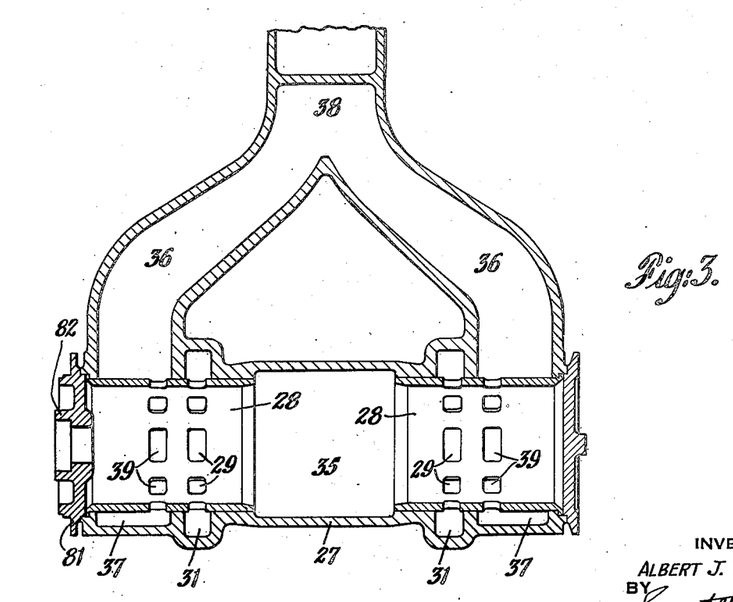
Figure 3 is a plan section through the valve chest of Figure 2, showing the relation of the valve bushings and ports to the exhaust steam passages, but omitting the valves themselves.

By reference first to Figures 1 to 3 it will be observed that the locomotive has the usual driving wheels, diagrammatically illustrated at 16, pilot truck wheels 17, main crank pin at 18, connecting rod 19 mounted at one end on said crank pin and having its other end pivotally coupled at 21 with a crosshead 22 working in the crosshead guide 23, said crosshead being mounted on the rod 24 of the piston 25 working in the cylinder 26. Cylinder head 26a may have packing gland means 26b for sealing around the piston rod 24. Side rods 20 couple the middle pair of driving wheels to the first and third pairs.

Surmounting the cylinder 26 is a valve chest structure 27 which at each end has a valve bushing 28, each of said bushings having an annular series of valve ports 29 communicating through passages 31 in the casting and cylinder ports 32 in the cylinder bushing 33 with the interior of the cylinder. A steam pipe fragmentarily shown at 34 communicates with the central chamber 35 of the chest. Exhaust passages 36 communicate with the end chambers 37 of the chest and extend laterally inwardly into the saddle structure (not shown in these figures) and thence upwardly at 38 to the usual exhaust nozzle. The flow of exhaust steam from within the valve bushings outwardly into the exhaust chambers 37 is by way of the annular series of supplementary exhaust valve ports 39.

Figures 13, 14:
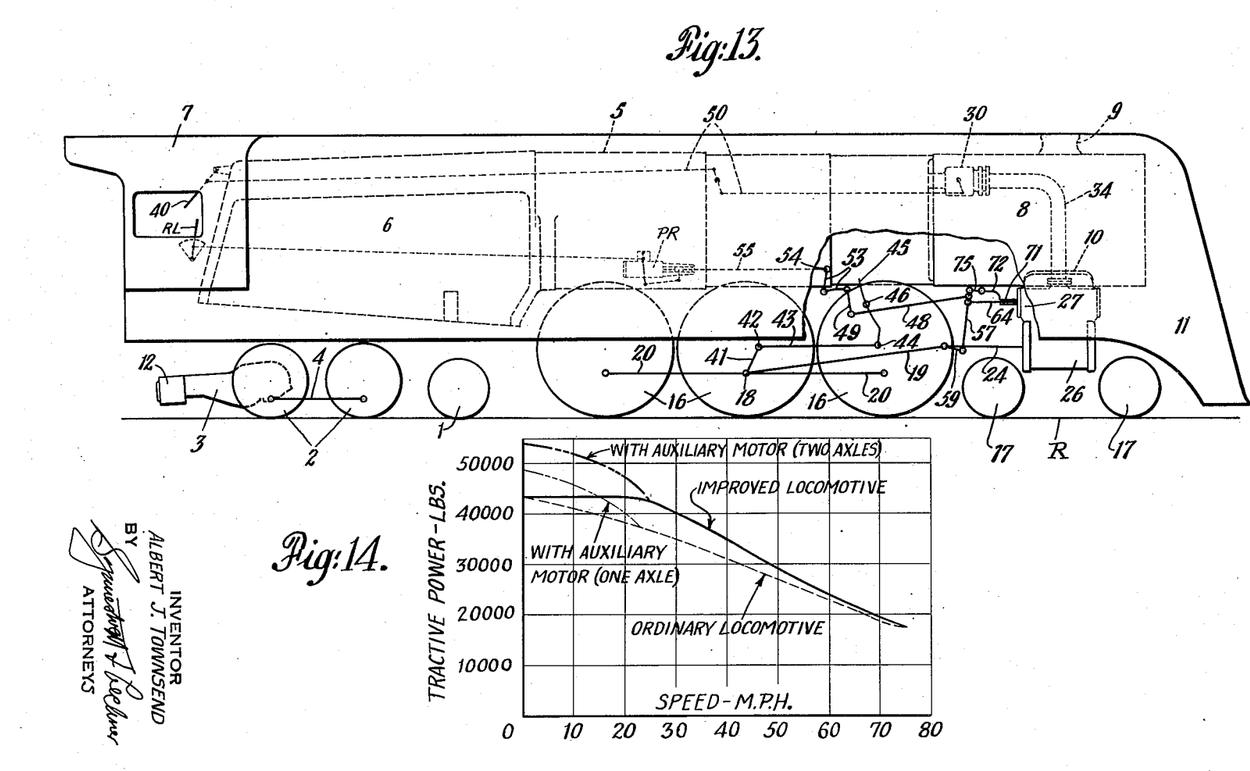
Figure 13 is a more or less diagrammatic side elevational view of a complete locomotive (omitting tender) showing only in outline the main parts of the running gear and valve motion mechanism illustrated in Figure 1, but illustrating the relationship of such parts to an over-sized boiler, carried by a novel wheel arrangement, employing an auxiliary motor as well as the main cylinders.
Figure 14 is a graph similar to Figure 12 but illustrating the results obtainable from the complete combination of features employed in the locomotive illustrated in Figure 13.

In the embodiment shown, the valve gear comprises an eccentric crank 41, pivotally connected at 42 to one end of the eccentric rod 43, the other end of which is pivotally connected at 44 to the tail of the link 45 which is pivoted for oscillation at 46. The usual link block, slidably adjustable in the link, is pivotally connected at 47 to the radius rod 48. The rear end of said rod is connected by lifting link 49 and pivots 51, 52, to one arm of a bell crank lever 53, the other arm of which is pivotally coupled at 54 to any suitable reach rod 55, which may be controlled in the usual way, from a manually operated member or through a power reverse gear, by the engineman in the cab. (A typical arrangement, utilizing a power reverse gear PR, actuated by a reverse lever RL, is shown in Figure 13.)

The forward end of the radius rod 48 is pivotally coupled at 56 to the combining lever 57, the lower end of which is connected to the crosshead by means of pivot 58, union link 59, and pivot 61. At an intermediate point on the combining lever there is a pivotal connection 62 to the crosshead 63 of the main valve stem 64 which is coupled to said crosshead at 65. Said valve stem is coupled to the main valve assembly, comprising the hollow piston member 66 with ring-equipped piston heads 67, which latter are so positioned as to control the steam ports 29.

Except for features of construction adapted to accommodate the novel parts hereinafter described, the foregoing parts of the mechanism may be made in accordance with known and generally accepted practice.

The supplemental valve means forming part of the preferred embodiment of the present invention comprise two ring-equipped piston valve heads 68, interconnected by a series of shouldered rods 69 annularly disposed around the main piston rod 64. Suitable retaining nuts or the like are also provided, as shown. The rods 69 work with a sliding fit through bushings 60 fitted in apertures in the main piston heads 67.

Adjacent the rear end of the supplemental valve assembly, the rods are connected to the flange of a sleeve 71 which telescopes the main valve rod 64 and has axial motion relative thereto. The outer end of this sleeve is fixedly coupled by the elbow 72 to the crosshead 73 which in turn is connected by pivot 74 and link 75 to a pivot 76 located on an upward extension 77 of the combining lever. Elbow 72 is provided with packing gland means 70 to hold a packing between sleeve 71 and main valve stem 64.

For simplicity of manufacture and also for rigidity in operation, I preferably make the main and supplemental crosshead guides 78 and 79 integral with the rear valve chest cover or head 81 which may have suitable packing gland means 82 where the valve stems pass through.

In general it will be observed that the supplementary valve means are arranged in series with the main valve means, so far as the control of exhaust steam is concerned. Thus, an end of the cylinder may be closed to exhaust either by closure of a main valve port 29 by a main valve 67 or by closure of a supplemental valve port 39 by a supplemental valve 68. It can readily be seen, therefore, that when the main valve has uncovered its port to exhaust, the supplemental valve may or may not permit the exhaust of steam, depending upon its position at that time relative to its supplementary exhaust port.

It will also be seen, in general, that a given swinging motion of the combining lever 57, during a stage of operation when the pin 56 is acting as a fulcrum, will produce opposite movements of the main and supplemental valves, since the main valve is coupled to said lever at a point 62 below the point 56 and the supplemental valve is coupled to said lever at a point 76 above said point 56. I have found by experiment that to secure substantial equality of exhaust events at both ends of the cylinder the three pivot points 62, 56 and 76 will not necessarily be in line; and it will be noted that in the embodiment here shown there is a substantial forward offset of the pivot point 76 from the general axis of the combining lever. Most of the desired adjustments of the relation between the main valve operation and the supplemental valve operation can be secured by altering the relative positions of the pivot points 62 and 76 with relation to the pivot point 56.

Referring now to the diagrams of Figures 4 to 10 inclusive, it will be observed that these illustrate the position of the parts at the compression point for a series of typical positions of adjustment of the valve gear, during a forward working stroke of the piston. In these diagrams, while most of the parts are shown only as single lines, it will be readily understood that they correspond to the structural parts shown in Figures 1 and 2. The line indicating the piston 25, in each diagram, represents the mid-plane of the piston, when the piston is at that point in its forward stroke (indicated by the accompanying arrow) when compression is commencing at the head end of the cylinder, with the valve gear set at the cut-off indicated in the legend accompanying the diagram. The clockwise arrow adjacent the main crank indicates the direction of wheel rotation chosen for illustration. Most of the reference characters have been omitted from the parts shown in these diagrammatic views, as it is believed this renders the diagrams clearer.

Figure 4:
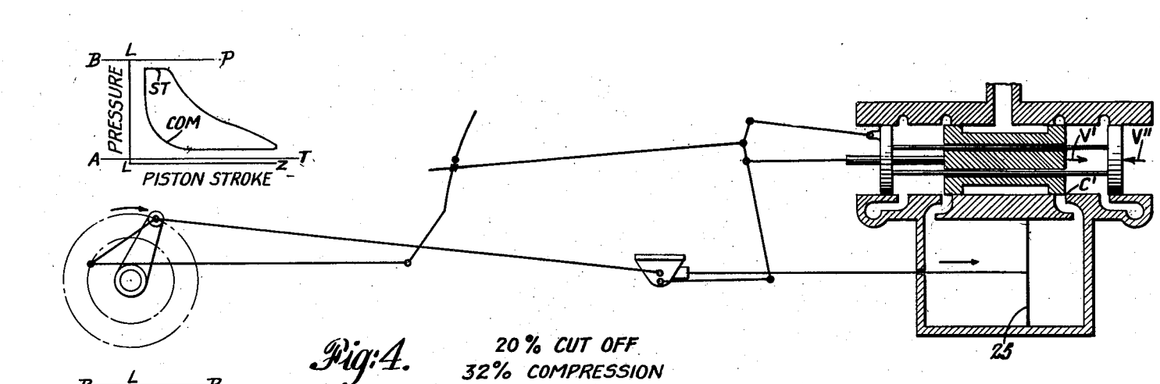
Figures 4 to 10 inclusive are a series of diagrams, each of which shows the positions of the major working parts for the right side of the engine, at the point of compression during the forward stroke of the piston, for successively longer cut-off adjustment settings of the valve gear, each diagram further showing the theoretical indicator card for one end of the cylinder, at the particular valve gear setting shown in the diagram.

Figure 4 shows that when the valve gear is set for a 20% cut-off, the main valve closes off the exhaust at such point in the piston stroke that there is compression throughout the last 32% of the stroke. It will be noted that the piston 25 still has to complete about 32% of its forward stroke, and that the main valve, moving in the direction of the arrow V', has just reached the closing edge C' of the main port to exhaust. The supplemental valve, moving in the direction of the arrow V'', is not under these conditions functioning to close the supplemental exhaust port.

Figure 5:
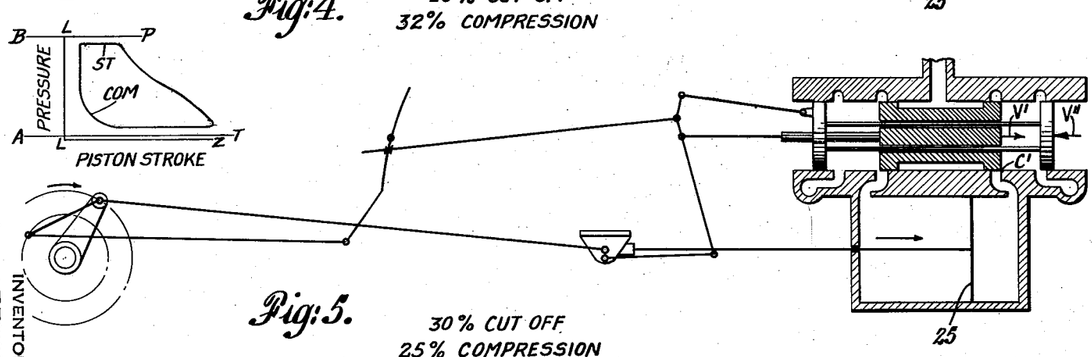
Figure 6:
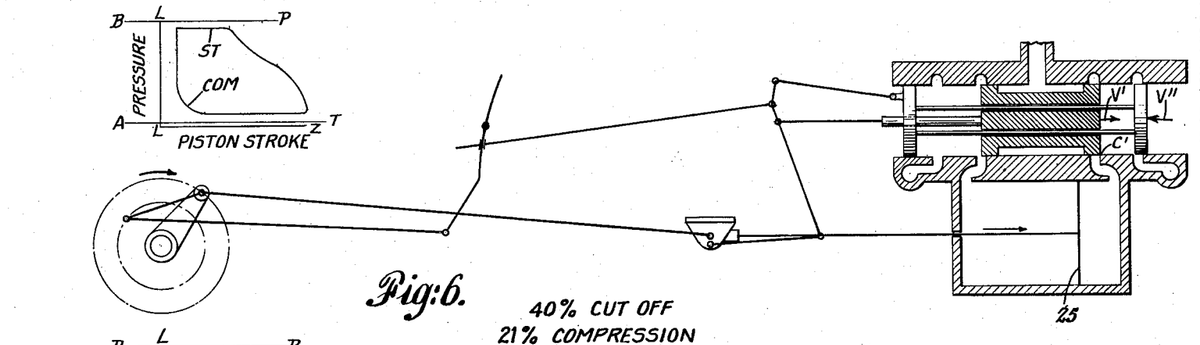

At 30% cut-off adjustment, as seen in Figure 5, the main valve gives a 25% compression; and at 40% cut-off, as seen in Figure 6, the compression phase is still controlled by the main valve and occupies the last 21% of the piston stroke.

Figure 7:
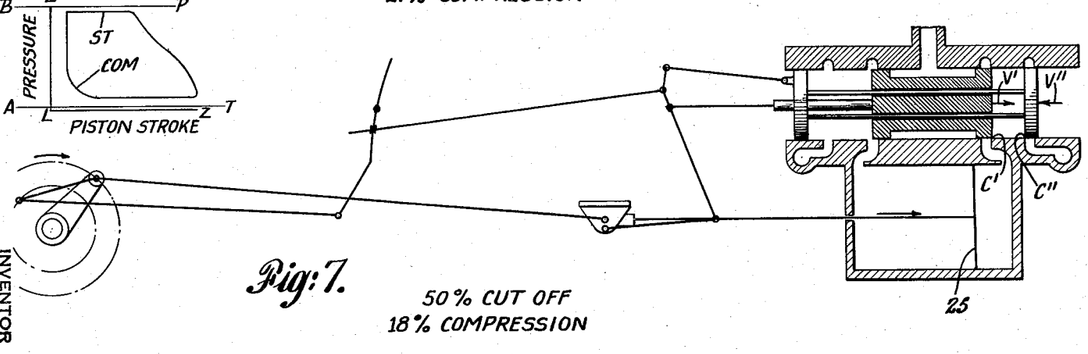

In the position of the parts shown in Figure 7, which represents the compression point at 50% cut-off adjustment, this particular embodiment is so designed that both the main valve and the supplemental valve reach the compression point at the same time, which is for 18% compression. It will be noted that the main valve has moved forwardly just to the point of closure (C') of its port to exhaust, and the supplemental valve has moved rearwardly just to the point of closure (C'') of the supplemental port to exhaust. From this point on, in the range of cut-off adjustments, i. e., at all the longer cut-off adjustments of the valve gear, the main valve (which would normally produce a shorter and shorter compression) becomes ineffective as to the compression function, and the supplemental valve assumes the control of this function.

Figure 8:
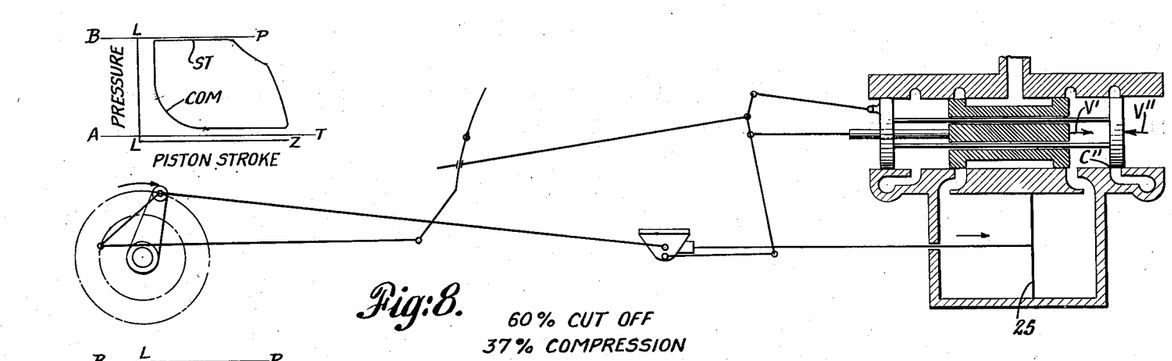

This is seen in Figure 8, which shows that for a 60% cut-off adjustment of the valve gear, the main valve has not yet closed the port to exhaust but the supplemental valve has closed the supplemental port, as shown at C'', thus giving compression for 37% of the stroke.

Figure 9:
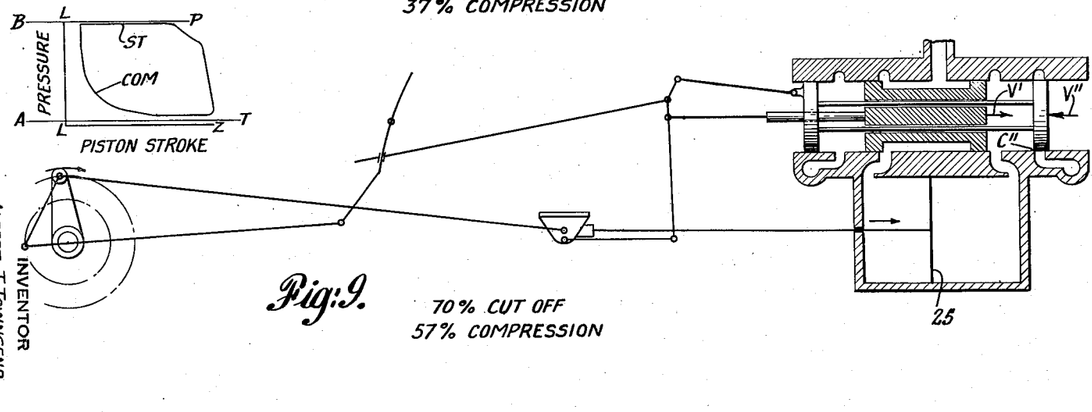

Figure 9 shows the further progression of this effect, for a setting of 70% cut-off, at which time the supplemental valve is giving 57% compression.

Figure 10:
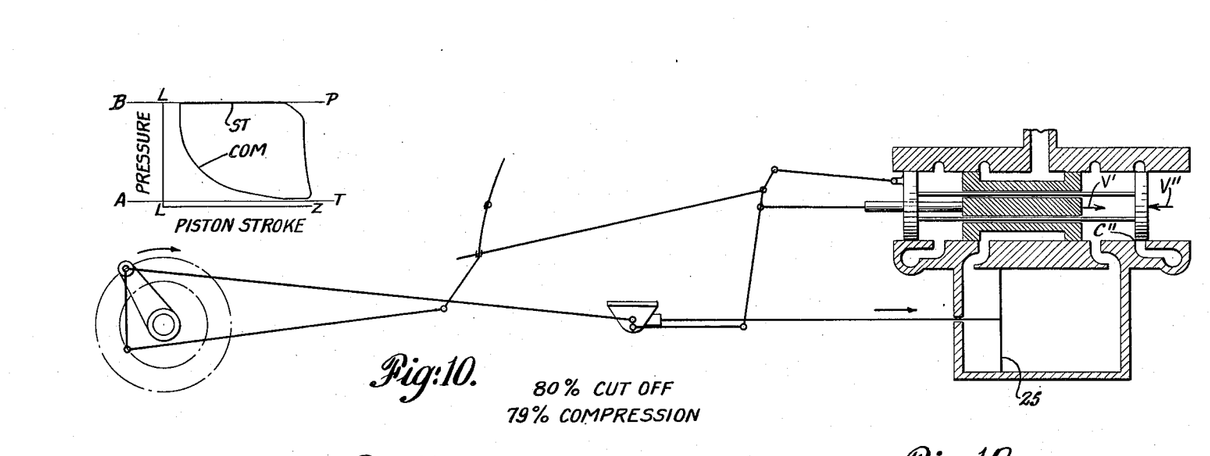

Figure 10 shows that at the full-gear position, giving 80% cut-off, the supplemental valve is causing 79% compression. Therefore, although steam is here being admitted back of the piston, for the forward stroke, throughout substantially the entire working stroke, the steam ahead of the piston (which would normally be exhausting at this time) is by my invention trapped in the cylinder by the head and end supplemental valve, and is progressively giving greater and greater resistance to the working steam. In other words, at start, when the valve gear is adjusted to a late cut-off, a large part of the steam which would normally pass to exhaust is used to impose a braking effect upon the piston.

Figure 11:
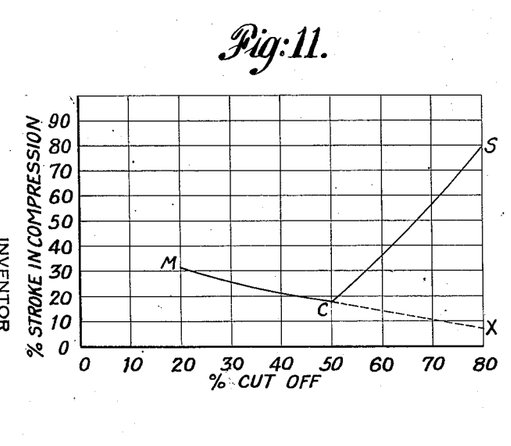
Figure 11 is a typical illustrative graph showing the compression (in terms of percentage of the piston stroke) plotted against cut-off adjustment; and showing also (by the dotted line) what the compression would be, at long cut-offs, if it were controlled as usual by the main valve, without the supplemental valve of the present invention.

The action of the two valves, in terms of the compression event, is shown by the graph of Figure 11. At starting, with the valve gear set for 80% cut-off, the main valve would normally give a compression of only about 7% or 8%, as shown by the dotted line commencing at the point "X." As the cut-off adjustment is shortened, the main valve would normally give a progressively longer compression all the way to the point "M," representing about 32% compression. However, the supplemental valve of the present invention is effective from full-gear position to a position of approximately 50% cut-off, as represented by the line S—C, and from there the main valve takes effect as represented by the line C—M, the point C being the change-over point, where the compression function is shifted from one valve to the other. It will be understood that this point as well as the numerical values can be altered by changing the geometry of the valve gear, particularly at the combining lever.

Figure 12:
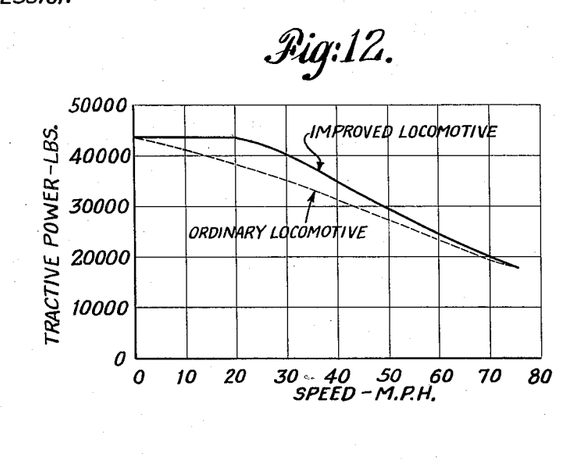
Figure 12 is a graph showing the tractive power in pounds, plotted against speed in M. P. H., the full line illustrating the average tractive power curve of a typical locomotive equipped with the present invention in comparison with the dotted line showing of the average tractive power curve of a corresponding locomotive not so equipped.

The possible operating results are illustrated by the graph of Figure 12. The dotted line shows mean tractive power in pounds plotted against speed in M. P. H., for an ordinary locomotive, and it will be observed that this tractive power falls off fairly uniformly from zero M. P. H. up to maximum M. P. H. The solid-line curve represents the mean tractive power obtainable by the use of the present invention in a similar locomotive, with, however, an increase in piston diameter and/or in steam pressure delivered to the cylinders sufficient to bring the starting tractive power up to about the same point (i. e., about 43,000 lbs.) notwithstanding the increased compression at starting. As the engine gradually picks up speed from zero M. P. H. to about 20 M. P. H., and the engineer gradually hooks back the reverse lever, the average tractive power remains fairly constant, since the compression is being reduced more rapidly at this time than is the cut-off. The improvement in operating results thus obtained by my improved locomotive will be apparent to anyone familiar with railroad practice.

Referring to the theoretical indicator cards associated with the structural diagrams (Figures 4 to 10), it will be noted that the usual reference lines are here employed. The line B—P represents the boiler pressure; the line A—T represents atmospheric pressure; the line L—Z represents the line of zero pressure, and is drawn to a length corresponding to effective cylinder volume; and the line L—L represents the cylinder clearance volume line, the distance between which and the indicator diagram proper represents the cylinder clearance volume existing when the piston is at one end of its stroke. The boot-shaped diagram associated with the reference lines is a theoretical one, based on the position of the valves and related parts in each of these figures, respectively, and is shown substantially in the conventional manner with relation to the reference lines. On each diagram, the upper line of the boot, marked ST represents approximately the steam line which would be drawn when the valve is open for steam admission. The heel of the boot, indicated generally by the letters COM indicates approximately the compression curve, showing the rise in pressure due to compression of the steam remaining in one end of the cylinder after it is closed to exhaust either by the main valve at C' or by the supplemental valve at C''.

It will be observed that where the steam admission portion of the diagram is at its maximum (as at 80% cut-off, Fig. 10) the heel of the diagram, representing compression, is also at its maximum, instead of being at its minimum, which would be the case in an ordinary locomotive with normal operation. As the cut-off is shortened, from the 80% adjustment shown in Figure 10, to the 70% adjustment shown in Figure 9, and thence to the 60% adjustment of Figure 8, the compression part of the curve correspondingly becomes less and less until it gets to the 50% cut-off position of Figure 7, but it will be seen to increase from then on through the adjustment positions of Figures 6, 5 and 4, in accordance with standard practice, so as to give the adequate cushioning effect necessary in the highest ranges of running speeds.

The invention as so far described will be readily seen to be highly advantageous in locomotives in general. However, the invention further involves other features, employable in combination with the mechanism above described. These features involve, in general, the cooperative association of an auxiliary motor to drive one or more axles other than the main driving axles, in lower portions of the speed range, a very substantial boiler having exceptional steaming capacity, and an arrangement of running gear adapted to serve the combined purposes of carrying the extra large boiler and utilizing the combined power of the main engine and the auxiliary engine. The novel advantages of the employment of these features in combination with the over-powered main cylinders and special valve mechanism hereinbefore described, will appear more clearly after a description of Figure 13, which illustrates in diagrammatical outline the main driving wheels, front truck wheels, valve motion parts, etc., already described, but additionally shows the associated cooperative elements of the locomotive which were omitted from the structural Figures 1, 2 and 3.

As seen in Figure 13, the locomotive embodies, in addition to three pairs of main driving wheels 16 and 4-wheel leading truck 17, a 6-wheel trailing truck having a pair of idle weight-carrying wheels 1, and two pairs of wheels 2, which are adapted to be driven by an auxiliary motor 3 of known type and side rods 4 which interconnect the wheels of these two pairs. The cylinders 12 of auxiliary motor 3 are desirably of greater than normal capacity, so as to be capable of effectively driving two of the trailer truck axles and thus utilizing the traction gained by the imposed weight of the large boiler shown.

The above wheel arrangement provides ample space and load-carrying capacity to mount a boiler 5 of very substantial capacity, which latter includes a firebox 6 of proportionately large capacity. At the back end is shown the usual cab 7, and at the front end the smokebox 8, stack 9, and boiler saddle 10. Although, of course, it is not a part of the present invention, I have shown in outline in this figure a streamlined shell or sheathing 11 extending from the front end of the locomotive right back to the cab 7. This has been broken away, in the region of the valve gear, so as to show the valve motion parts in that region in full lines.

The various details of the mechanism shown in this figure need not be further described, since they may be the same as those heretofore described with reference to Figures 1 to 3, and further since they bear reference numerals similar to those used in said figures.

It will be understood that the cylinders 26 of the main engine are over-powered, in the sense hereinbefore described, (for example, by being over-size), and that they and the cylinders 12 of the auxiliary motor are both supplied with steam from the boiler 5. As the auxiliary motor 3, with the steam supply to its cylinders, and the controls for cutting the said motor into and out of operation, are already known in ordinary locomotive design, they need not be illustrated or described herein, but it will be understood that such motor can normally be put into operation throughout the first quarter or third of the speed range of the locomotive, by means operatively associated with the reverse lever RL.

According to the present invention, the size of the boiler, as shown, is such as to be able to supply, during the lower portion of the speed range, not only the over-sized auxiliary motor cylinders 12 but also the over-sized main cylinders 26 while the auxiliary valve means of the latter cylinders are imposing the extended compression heretofore described as accompanying long cut-off. Such boiler capacity is also made to approximate the total steam consuming capacity of the main cylinders alone, when operating with short cut-off and normal compression during the higher portion of the locomotive speed range, when the auxiliary motor is cut out of operation.

The extended compression resulting from the use of the supplementary valve means causes, in effect, a braking action which is imposed directly on the pistons in the cylinders 26 (and thus indirectly upon the main driving wheels 16), such action in the starting phase of operation being sufficient to prevent spinning of the main driving wheels, at least under normal conditions of adhesion on the rails R. The total tractive power during a substantial part of the lower half of the speed range of the locomotive is, however, maintained substantially at or above the normal mean tractive power through that portion of the range, as compared with the ordinary auxiliary-motor-equipped locomotive, and as the locomotive picks up speed within the lower half of the speed range, the normal adjustments of the valve gear toward a shortened cut-off result at the same time in reducing the braking effect of the supplemental valve means, so that this high starting tractive power is substantially maintained over an extended portion of the speed range, with the result that a substantial increase in mean average tractive power for the speed range taken as a whole is secured.

Typical results obtainable from the combined arrangement shown in Figure 13 are illustrated in the graph of Figure 14. The dotted line in this Figure is a typical average tractive power curve of an ordinary locomotive. The light chain-dotted line associated therewith illustrates the increase in tractive power theoretically obtainable in such a locomotive by the addition of an auxiliary motor to a normally idle axle (assuming that the boiler of such ordinary locomotive is of a type capable of supplying such auxiliary motor with steam—which is not always the case). The full-line part of the graph illustrates the increased tractive power gained by my improved locomotive having over-powered main cylinders utilizing the extended compression feature of the present invention, and the heavy chain-dotted line associated therewith shows the further increase in tractive power obtainable in the lower portion of the speed range by the cooperative action of the extra-powered auxiliary motor and the over-powered main cylinders in a locomotive wherein the boiler is of such size as to supply both the over-powered main cylinders and an auxiliary motor of capacity sufficient to drive two trailing axles.

Figure 15:
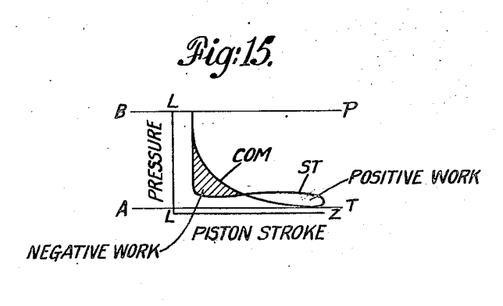
Figure 15 is a theoretical indicator card for one end of the cylinder, such as would be secured with the valve gear set for 80% cut-off (as shown in Figure 10) but with the steam throttled down to the point where the positive work and the negative work in the cylinder are approximately equal.

Turning now to Figure 15, it will be seen that my method and mechanism can be employed in a novel way for a special purpose, i. e. to take up lost motion in rods, driving-boxes, etc., for example when the locomotive is drifting. If, during drifting, the throttle 30 (Figure 13) is opened somewhat, by means of the usual throttle lever 40 and operating connections 50; and if, at the same time, the reverse gear is put in full-gear position corresponding to the direction of drifting of the locomotive, as by means of the power reverse gear PR, actuated by the reverse lever RL, steam will be admitted to the cylinders throughout the major portion of the piston stroke but not in sufficient volume to develop a very high positive working pressure in the cylinders (as shown by the line ST of the theoretical indicator card of Figure 15). At the same time, by utilization of the extended compression feature of my invention, a considerable compression will be developed in the cylinders, as indicated by the curve COM in said indicator card, with the result that the positive work done in the cylinders will be about equalled by the negative work, the latter being indicated by the shaded area in the figure. This operation will substantially minimize the slack or hammer in the moving parts of the machinery during drifting.

Figure 16:
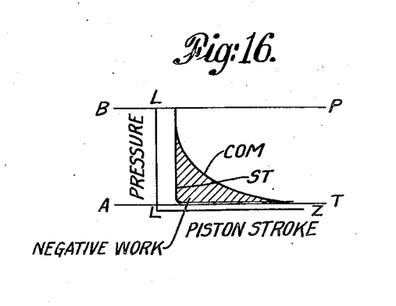
Figure 16 is a theoretical indicator card, at a similar adjustment of the valve gear, with the throttle nearly closed, so that the steam admitted to the cylinder is just about enough to follow up the piston at a pressure, for example not appreciably greater than the normal exhaust pressure, so that only a braking force is developed in the cylinders.

As shown by the theoretical indicator card of Figure 16, the negative work or braking effect, secured by a long compression, at long cut-off, can be made to predominate, even to the practical elimination of positive work in the cylinders, so as to supplant or supplement the braking action of the normal brake system on the locomotive, at times when absolute braking action is desired. In this case, as before, the lengthened compression is employed along with long cut-off, but the throttle is closed down still further (as compared with that resulting in the card of Figure 15), to the point where the steam pressure behind the piston, at each stroke, approximates or does not appreciably exceed the average exhaust pressure of the engine. The compression of this steam on the exhaust stroke results in a net or absolute braking effect.

It is believed that my novel method of operation and preferred structure for carrying out such method, as well as the results obtainable, will now be apparent from the foregoing description, without further elaboration. Within the intended scope of the appended claims, variations of the method may be adopted, other mechanisms may be employed to carry out the method, and modifications of the mechanism to suit different types of engines, of valves and of valve gear, or to suit different operating conditions, may be made; as the disclosure on which these claims are based is illustrative rather than limitative.

I claim:

1. The method of operating a steam locomotive, having pistons and cylinders with valve means adjustably operative to vary the period of steam admission and the period of steam compression in said cylinders relative to piston stroke, which method comprises operating the valve means to provide, along with a long admission period, a compression period which is appreciably greater than that which accompanies the shortened admission period normally employed under average running conditions.

2. The method of operating a steam locomotive, having pistons and cylinders with valve means providing for the events of admission, cutoff, release and compression and adjustably operative to vary the periods of steam admission, expansion, exhaust and compression in said cylinders relative to piston stroke, which method comprises operating the valve means to provide, along with a long admission period, a compression period which is appreciably greater than that which accompanies the shortened admission period normally employed under average running conditions, such increase in the compression period being accomplished by shortening the exhaust period.

3. A method according to claim 2, wherein the shortening of the exhaust period is accomplished by advancing the timing of the compression event without correspondingly altering the release event when operating at or near maximum cut-off.

4. The method of operating a steam locomotive, having pistons and cylinders with valve means providing for the events of admission, cut-off, release and compression and adjustably operative to vary the period of steam admission and the period of steam compression in said cylinders relative to piston stroke, which method comprises operating the valve means to provide a lengthened compression period along with a long admission period by advancing the timing of the compression event without correspondingly altering the release event when operating at or near maximum cut-off.

5. The method of distributing steam in a steam engine, having pistons and cylinders with valve means adjustably operative to vary the period of steam admission and the steam compression in said cylinders relative to piston stroke, which method comprises unidirectionally progressively altering the period of steam admission through a predetermined range of adjustment and variably altering the compression by progressively reducing it during the first portion of said range and progressively increasing it during a succeeding portion of said range.

6. The method of distributing steam in a steam engine, having pistons and cylinders with valve means adjustably operative to vary the steam admission and the steam compression in said cylinders relative to piston stroke, which method comprises unidirectionally progressively altering the period of steam admission through a predetermined range of adjustment and variably altering the compression by progressively reducing it during the first portion of said range and progressively increasing it during a succeeding portion of said range, and effecting said progressive reduction of compression at such rate as will maintain a substantially uniform mean effective pressure in the cylinders during an extended part of said first portion of said range.

7. The method of distributing steam relative to piston movements in a double-acting cylinder of a locomotive engine having valve means operative to vary the duration of the period of admission and of the period of exhaust of the steam relative to the piston stroke, which method comprises employing a short exhaust period by effecting an early compression of the steam successively in each end of the cylinder while utilizing in the opposite end a long period of admission, and employing a relatively longer exhaust period by effecting a later compression of the steam while utilizing a shorter period of admission and again employing a short exhaust period by effecting an early compression of the steam while utilizing the shortest period of admission.

8. The method of operating a steam locomotive, having a throttle, pistons and cylinders with valve means adjustably operative to vary the period of steam admission and the period of steam compression in said cylinders relative to piston stroke, which method comprises operating the valve means to provide a long compression period along with a long admission period and maintaining the throttle open to such extent as to develop approximately equal positive and negative work in the cylinders, whereby to take up lost motion in the locomotive machinery, as when drifting.

9. The method of braking a steam locomotive incorporating a throttle, pistons and cylinders with valve means adjustably operative to vary the period of steam admission and the period of steam compression in said cylinders relative to piston stroke, which method comprises developing an absolute braking force in the locomotive cylinders by maintaining the throttle open slightly and operating the valve means to provide a long compression period along with a long admission period.

10. In a locomotive engine having a cylinder and piston and a valve gear adjustable to vary the period of steam admission, a valve operative to provide an extended compression period to accompany a very late cut-off and a shorter compression period to accompany an earlier cut-off, and another valve operative to provide such late and earlier cut-offs, and connections between said valve gear and said valves coupled to derive different motions from the same member of the valve gear adapted to effect said operations of said valves.

11. In a locomotive engine having a cylinder and piston and a valve gear adjustable to vary the period of steam admission, a valve operative to provide an extended compression period to accompany a very late cut-off and a shorter compression period to accompany an earlier cut-off, and another valve operative to provide another extended compression period with a still earlier cut-off, and connections between said valve gear and said valves coupled to derive different motions from said valve gear adapted to effect said operations of said valves.

12. In a locomotive engine having a cylinder and piston and a valve gear adjustable to vary the period of steam admission, a valve operative to provide an extended compression period to accompany a very late cut-off and a shorter compression period to accompany an earlier cut-off, and another valve operative to provide another extended compression period to accompany a still earlier cut-off, said last mentioned valve having cooperating portage and steam passaging for effecting the admission of steam and being operative to effect said different cut-offs, and connections between said valve gear and said valves coupled to derive different motions from said valve gear adapted to effect said operations of said valves.

13. In a locomotive engine having a cylinder and piston and a valve gear adjustable to vary the period of steam admission, a valve operative to provide an extended compression period with a very late cut-off and a shorter compression period with an earlier cut-off, and another valve operative to provide another extended compression period with a still earlier cut-off, connections between said valve gear and said valves coupled to derive different motions from said valve gear adapted to effect said operations of said valves, and an exhaust passage system wherein said two valves are in operative series.

14. In a locomotive engine having a cylinder and piston and a valve gear adjustable to vary the period of steam admission, a valve operative to provide an extended compression period with a very late cut-off and a shorter compression period with an earlier cut-off, and another valve operative to provide such late and earlier cut-offs, and connections between said valve gear and said valves coupled to derive different motions from said valve gear adapted to effect said operations of said valves, said valves having a common seat.

15. In a locomotive engine having a cylinder and piston and a valve gear adjustable to vary the period of steam admission, a valve operative to provide an extended compression period with a very late cut-off and a shorter compression period with an earlier cut-off, and another valve operative to provide such late and earlier cut-offs, and connections between said valve gear and said valves coupled to derive different motions from said valve gear adapted to effect said operations of said valves, said valves having a common seat with independent ports associated respectively with said valves.

16. In a locomotive engine having a cylinder and piston and a valve gear adjustable to vary the period of steam admission, a valve operative to provide an extended compression period with a very late cut-off and a shorter compression period with an earlier cut-off, and another valve operative to provide such late and earlier cut-offs, and connections between said valve gear and said valves coupled to derive different motions from said valve gear adapted to effect said operations of said valves, said valves having a common seat with independent ports associated respectively with said valves in serial relation.

17. In a locomotive engine having a cylinder and piston and a valve gear adjustable to vary the period of steam admission, a valve operative to provide an extended compression period with a very late cut-off and a shorter compression period with an earlier cut-off, and another valve operative to provide such late and earlier cut-offs, and connections between said valve gear and said valves coupled to derive different motions from said valve gear adapted to effect said operations of said valves, said valves being in one chest and said connections being in telescopic relation at least in passing through an end wall of said chest.

18. In a locomotive engine having a cylinder and piston and a valve gear adjustable to vary the period of steam admission, a valve operative to provide an extended compression period with a very late cut-off and a shorter compression period with an earlier cut-off, and another valve operative to provide such late and earlier cut-offs, and connections between said valve gear and said valve coupled to derive different motions from said valve gear adapted to effect said operations of said valves, said valve gear having a combining lever with a moving fulcrum point, and said connections being coupled to said lever at points corresponding to lever arms on opposite sides of said point.

19. In a locomotive engine having a cylinder and piston, and a main valve adapted to effect admission, cut-off, release and compression of the steam with respect to both the head end and the crank end of said cylinder in variable timed relation to the piston stroke, a supplemental valve in series with the main valve and adjustably actuable to alter the compression, and mechanism for actuating both of said valves in such relation that the main valve effects a long compression at early cut-offs and a shorter compression at intermediate cut-offs, and the supplemental valve effects a long compression at relatively late cut-offs.

20. In a steam locomotive having main wheels normally operating as driving wheels over the entire speed range of the locomotive and supplemental wheels normally operating as driving wheels over only a part of the speed range, a steam motor adapted to drive said supplemental wheels through a substantial portion of the lower half of the speed range, a steam engine for driving said main wheels comprising cylinders and driving parts proportioned to impose a maximum driving torque upon said main wheels at start in excess of the normal static adhesion of said wheels upon the rails, controllable means for adjusting the operation of said engine, means for imposing a braking action on the main wheels at start adequate to normally prevent slippage of said main wheels, an operative interconnection between said controllable means and said braking means effecting an imposition of said braking action upon adjustment of the controllable means to condition the locomotive for starting, and a boiler having steaming capacity adequate to the maximum demands of said engine alone when operating in the upper half of the speed range and approximating the combined steam consumption of said motor and said engine with said braking means effective while operating in that portion of the speed range where the motor is operated.

21. A construction according to claim 20, wherein there are a plurality of pairs of said supplemental wheels adapted to carry part of the weight of said extra-capacity boiler, said motor being of a capacity to impose a driving effort upon said plurality of pairs of supplemental wheels sufficient to make effective use of the traction gained by the boiler weight thereon.

22. A construction according to claim 20 in which the braking means comprises steam distribution and control mechanism for the engine cylinders providing a compression period in the cylinders throughout a greater percentage of the piston stroke at start than at an intermediate speed of operation between start and high speed.

ALBERT J. TOWNSEND.

REFERENCES CITED

The following references are of record in the file of this patent:

UNITED STATES PATENTS

| Number | Name | Date |
|---|---|---|
| 922,036 | Prescott | May 18, 1909 |
| 1,478,593 | Woodard | Dec. 25, 1923 |
| 1,517,881 | Woodard | Dec. 2, 1924 |
| 1,545,292 | Vincent | July 7, 1925 |
| 1,572,171 | Westinghouse | Feb. 9, 1926 |
| 2,081,458 | Lentz | May 25, 1937 |
| 2,145,293 | Clifford | Jan. 31, 1939 |
| 2,285,320 | Whitmore | June 2, 1942 |

FOREIGN PATENTS

| Number | Country | Date |
|---|---|---|
| 284,939 | Germany | June 19, 1915 |

Certificate of Correction

Patent No. 2,517,943 August 8, 1950

ALBERT J. TOWNSEND

It is hereby certified that error appears in the printed specification of the above numbered patent requiring correction as follows:

Column 1, line 35, for the hyphenated word "cut-of" read *cut-off*; column 6, line 24, for the word "or", second occurrence, read *of*; column 10, line 66, after "head" strike out "and";

and that the said Letters Patent should be read as corrected above, so that the same may conform to the record of the case in the Patent Office.

Signed and sealed this 24th day of October, A. D. 1950.

[SEAL]

THOMAS F. MURPHY,
*Assistant Commissioner of Patents.*